(12) United States Patent
Matsumoto et al.

(10) Patent No.: US 6,309,147 B1
(45) Date of Patent: Oct. 30, 2001

(54) UNDERWATER REMOTE DRILLING TOOL AND METHODS

(75) Inventors: Jack T. Matsumoto, Sunnyvale, CA (US); Benedict Kazirskis, Barto, PA (US); Vernon W. Pence; James F. Kasik, both of San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/073,820

(22) Filed: May 6, 1998

Related U.S. Application Data

(62) Division of application No. 08/848,434, filed on May 8, 1997, now Pat. No. 5,802,126, which is a division of application No. 08/529,229, filed on Sep. 15, 1995, now Pat. No. 5,687,205.

(51) Int. Cl.[7] .................................................... B23B 47/34
(52) U.S. Cl. ............................ 408/67; 408/97; 408/204
(58) Field of Search ................................. 408/56, 67, 57, 408/95, 97, 204, 703

(56) References Cited

U.S. PATENT DOCUMENTS

| | | | |
|---|---|---|---|
| 4,037,982 | * | 7/1977 | Clement ................................. 408/67 |
| 4,752,181 | * | 6/1988 | Hill ......................................... 408/67 |
| 5,253,961 | * | 10/1993 | Geissler ................................. 408/67 |
| 5,395,187 | * | 3/1995 | Slesinski et al. ..................... 408/67 |
| 5,802,126 | * | 9/1998 | Matsumoto et al. .................. 408/67 |

FOREIGN PATENT DOCUMENTS

| | | | |
|---|---|---|---|
| 256325 | * | 3/1912 | (DE) ..................................... 408/97 |
| 169705 | * | 9/1984 | (JP) ....................................... 408/56 |

* cited by examiner

*Primary Examiner*—Daniel W. Howell
(74) *Attorney, Agent, or Firm*—Nixon & Vanderhye P.C.

(57) ABSTRACT

A remotely operated drilling tool is configured to produce holes in a core shroud support plate inside of a nuclear reactor vessel. The tool includes a support base that is securely mounted directly above the location where the hole will be formed. In a first operation, a drilling tool is secured to the support base and drills a hole through about 90% of the shroud support plate. The drilling tool includes chip capturing structure to prevent chip created by the machining process from contaminating the water in the reactor vessel. After about 90% of the hole is drilled with the drilling tool, an EDM tool is secured to the support base to machine the remainder of the hole using an EDM process. The EDM tool includes structure for machining the remainder of the hole, removing the slug from the hole, and performing a spotface on the underside of the shroud support plate. The underwater drilling tool is capable of producing high quality holes faster and more efficiently than the current EDM process, while maintaining control of all foreign material, minimizing the deleterious effects on the material being drilled, and reducing the risk associated with poor tool reliability and breakage.

11 Claims, 15 Drawing Sheets

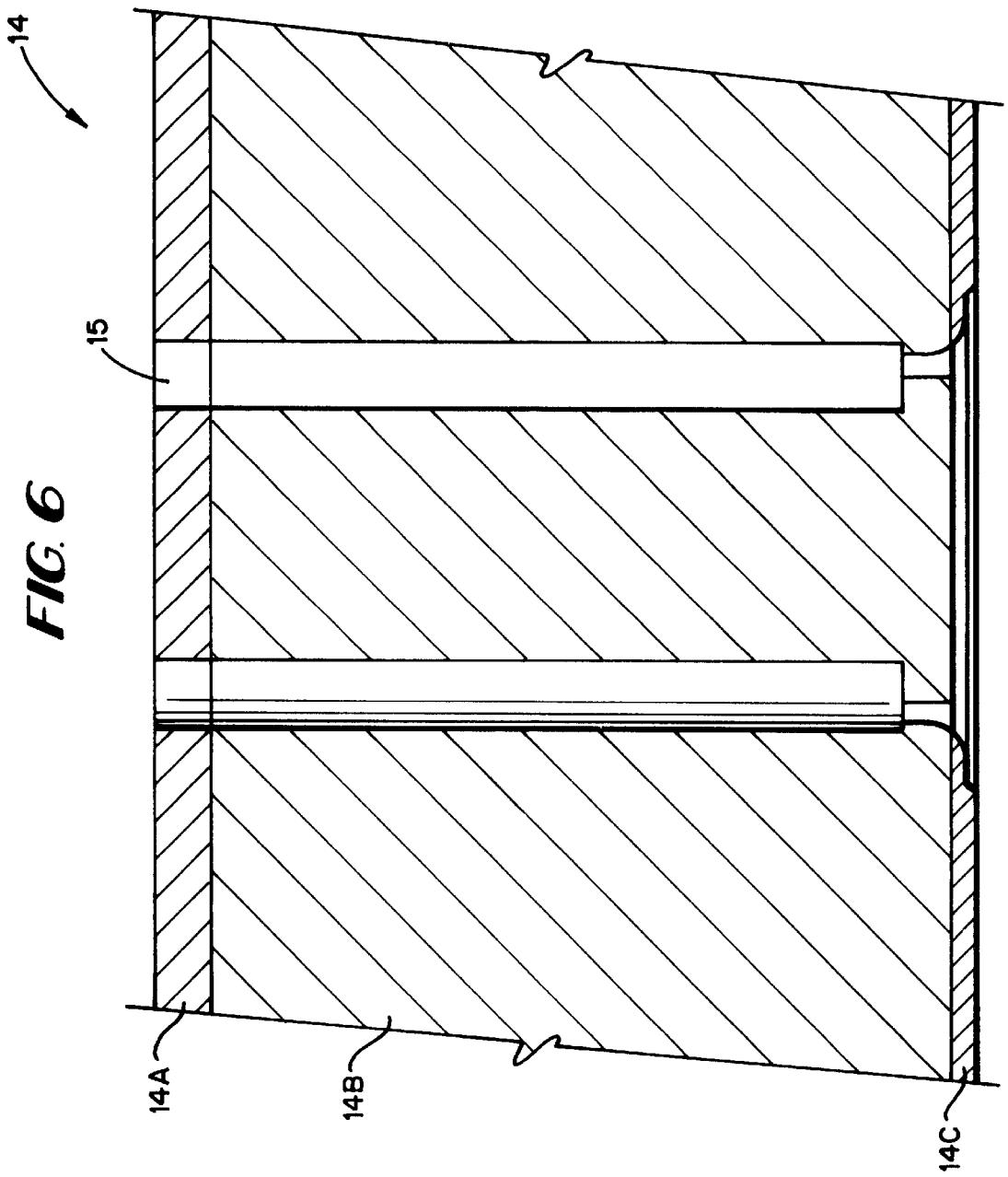

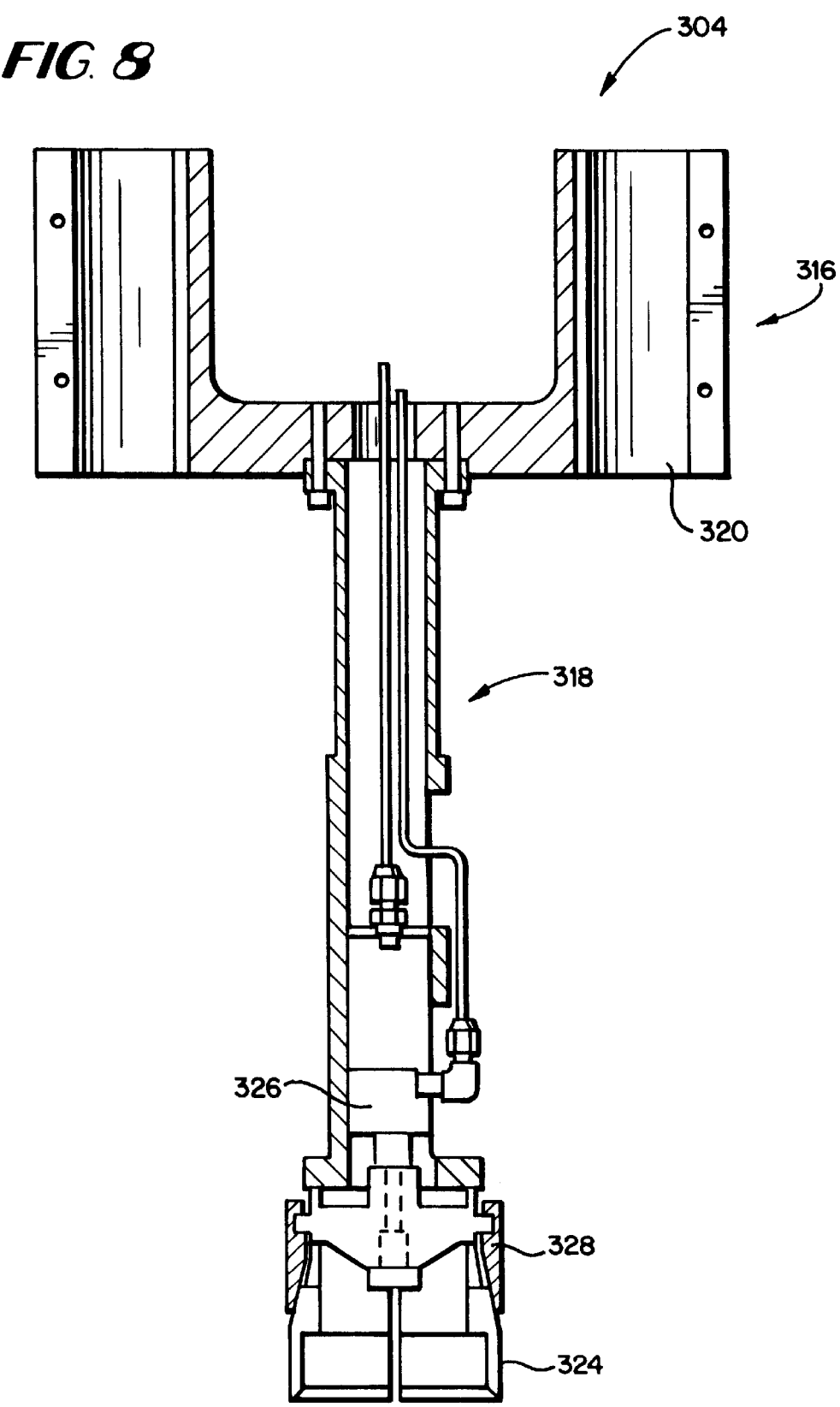

UNDERWATER REMOTE DRILLING TOOL AND METHODS

This is a divisional application of application Ser. No. 08/848,434, filed May 8, 1997, now U.S. Pat. No. 5,802,126, which is a divisional of application Ser. No. 08/529,229, filed Sep. 15, 1995, now U.S. Pat. No. 5,687,205.

TECHNICAL FIELD

The invention relates to an underwater remote drilling tool and, in particular, to an underwater remote drilling tool for drilling holes in the core shroud support plate between two jet pump diffusers in a nuclear reactor vessel.

BACKGROUND

In order to perform maintenance and modifications to nuclear reactor vessel internals, it is necessary at times to perform machining on the existing internal components. One such repair involves the addition of several restraint rods, (usually four) which anchor to the lower shroud support plate area, and extend upward to connect over the top of the shroud cylinder. Although the configurations of each plant vary, therefore creating some differences in the designs of each system, there is a common need in most designs to produce holes in the shroud support plate, adjacent the jet pump diffusers for attachment of repair components. The governing nature of the reactor vessel internal components is such that essentially all work is performed in-situ, underwater (obtaining depths of up to 100 feet), keeping radiation exposure of the workers to a minimum. Foreign materials exclusion (FME) is of utmost concern due to its potentially deleterious effect on the nuclear fuel, monitoring systems, flow of coolant/moderator, etc. The working envelope is typically very restrictive, and thus, all tooling must be compact and remotely operated.

The conventional method for performing machining operations on reactor vessel internal components utilizes a metal removal process called electrical discharge machining (EDM). By creating an electrical spark across a small gap between an electrode and the workpiece, the material is essentially eroded away, producing a swarf by-product. It has been shown that any swarf left after the EDM process poses no detrimental concerns as a foreign material. As there are no real mechanical reaction forces between the workpiece and electrode, the tooling developed need not be very substantial, thereby lending itself to packaging tools within the restrictive interference envelopes.

The EDM process, though predominantly utilized, is a very slow, time consuming process. Typical best anticipated times to produce a 3 inch diameter hole in a 1 ½ inch thick workpiece are upwards of 16 hours. Effects of ambient pressure, side arcing, electrode wear, hole breakthrough, swarf flushing and tooling failures due to long submersion times can all contribute to excessive delays during the EDM process. Moreover, inherent to the EDM process is the quick heating/cooling cycle generated with each spark. This rapid heating/cooling creates a re-cast layer on the machined surface. Depending on the material being machined, it is sometimes necessary to grind or hone the re-cast layer to remove any microfissures that may be detected.

Conventional machining inside the reactor vessel has historically not been attempted due to the generation/retention requirements of the chips produced. Thus, there is a need for improved productivity and process reliability of machining reactor vessel internals.

DISCLOSURE OF THE INVENTION

Accordingly, it is an object of the invention to provide an underwater remote drilling tool and methods that reduce the time for machining existing internal components of a nuclear reactor vessel. It is another object of the invention to provide an underwater remote drilling tool that utilizes a standard tooling system while maintaining control of all foreign material, minimizing deleterious effects on the material being drilled. It is still another object of the invention to provide an underwater remote drilling tool with increased tool reliability.

These and other objects of the invention are achieved by providing a support base insertable between two jet pump diffusers in a nuclear reactor vessel for supporting a machining tool, the vessel including a core shroud and a core shroud support plate. The support base includes a first leg having a first extendible member engageable with the core shroud; a second leg having a second extendible member engageable with one of the two jet pump diffusers; and a third leg having a third extendible member engageable with the other of the two jet pump diffusers. The support base is positionable on the core shroud support plate, and when the first, second and third extendible members are extended, the support base is substantially immovably secured between a vessel wall and the core shroud. The support base may include a centering device disposed substantially between the second and third legs, the centering device centering the support base between the two jet pump diffusers.

In accordance with another aspect of the invention, a support base for supporting a machining tool includes a first leg having a first extendible member; a second leg spaced from the first leg and having a second extendible member; and a third leg spaced from the first and second legs and having a third extendible member. The first, second and third extendible members are selectively extendible and retractable by a hydraulic driving device. In a preferred arrangement, the support base may include additional elements such as a substantially centrally disposed aperture, enabling access to a support base supporting surface for the machining tool; a sealing member disposed substantially coaxial with the aperture and between the aperture and the supporting surface; and leveling structure for leveling the support base on the support base supporting surface. The support base may further include structure for receiving at least one positioning dowel of the machining tool and structure for receiving at least one fixing member of the machining tool. Still further, the support base may include a centering device disposed substantially between the second and third legs, the centering device centering the support base between the two jet pump diffusers.

A method of securing a support base for a machining tool between two jet pump diffusers in a nuclear reactor vessel is also provided. The method includes positioning the support base between the core shroud and the vessel wall; positioning the support base between the two jet pump diffusers; and extending, with the hydraulic driving device, the first, second and third extendible members such that the first leg engages the core shroud and the second and third legs engage the two jet pump diffusers, respectively.

In accordance with yet another aspect of the invention, there is provided a drilling tool for drilling a bore in the shroud support plate. The drilling tool includes a rotatable spindle; a substantially cylindrical drill bit coupled to the spindle; a sleeve surrounding the drill bit, the sleeve being fixed from rotation such that it does not rotate with the drill bit; and a chip collection system collecting chip produced during drilling. An induction ring may be provided surrounding a connection area between the spindle and the drill bit, wherein the chip collection system includes a fluid inlet into the induction ring and into the spindle. The drill bit may include a flute having a flute inlet at a cutting end of the drill bit and a flute outlet at a spindle end of the drill bit. The induction ring includes a ring outlet disposed adjacent the flute outlet, wherein the chip collection system further includes the flute and the ring outlet. The chip collection system may further include a mesh chip basket communicating with the ring outlet, the mesh chip basket being configured to collect the chip produced during drilling.

A housing may be provided surrounding the spindle, the drill bit and the sleeve. The housing includes a drilling tool base plate having a locating dowel facing the shroud support plate, wherein the locating dowel is shaped to fit into a corresponding locating hole on a support base secured to the shroud support plate. The drilling tool base plate may further include an attachment member for securing the drilling tool to the support base and alternatively or additionally a hydraulic swing clamp shaped to fit through a swing clamp hole in the support base.

The drilling tool may further be provided with a DC servo motor and a feed motor operatively coupled to the spindle for rotatably driving the spindle and the drill bit and for feeding the spindle and the drill bit, respectively. The rotating speed and a feed rate of the spindle and the drill bit are variable. A controller communicates with the DC servo motor and the feed motor and controls feed rate based on the rotating speed.

A method for drilling holes in a core shroud support plate using the drilling tool is also provided. The method includes securing the drilling tool adjacent the core shroud support plate; flowing water under pressure between a cutting end of the drill bit and the shroud support plate; and rotating the drill bit to drill a hole in the shroud support plate. The water preferably flows in an inlet through the spindle, into a center of the drill bit, between the cutting end of the drill bit and the shroud support plate, into a flute inlet in the drill bit, and out through a flute outlet into a mesh chip basket.

In accordance with still another aspect of the invention, there is provided an electrical discharge machining (EDM) tool insertable in a nuclear reactor vessel for machining a portion of a shroud support plate. The EDM tool includes a support frame; a carriage assembly movably coupled to the support frame; and a spindle assembly rotatably coupled to the carriage assembly. The EDM tool may include additional elements such as a first driving mechanism for axially driving the carriage assembly along the support frame and a second driving mechanism for rotatably driving the spindle assembly; at least one radial bearing disposed between the carriage assembly and the spindle assembly, the at least one radial bearing facilitating rotation of the spindle assembly relative to the carriage assembly; vacuum structure for vacuuming swarf while the sever electrode machines the shroud support plate; and a collet assembly including a collet carriage movably coupled to the support frame and a collet extension attached to the collet carriage, the collet extension being shaped to fit inside of the spindle assembly, wherein when the collet extension is disposed inside of the spindle assembly, the collet carriage rests on the carriage assembly.

The support frame may include a rail, the carriage assembly being coupled to the rail, and the EDM tool may further include a linear bearing disposed between the rail and the carriage assembly, the linear bearing facilitating axial translation of the carriage assembly along the rail. The spindle assembly may include a substantially cylindrical sever electrode disposed at an end thereof for rotation with the spindle assembly, the sever electrode being configured to machine the shroud support plate.

A spotface assembly may be coupled to an end of the spindle assembly, and a spotface positioning mechanism may be coupled to the carriage assembly. The spotface assembly includes an EDM electrode configured to form a spotface on a side of the shroud support plate opposite from the EDM tool. The EDM electrode is preferably pivotable between a transport position and a spotface position, the spotface positioning mechanism including a pivot finger coupled to a driving mechanism and extendible through an aperture in the EDM electrode. The driving mechanism drives the pivot finger to displace the EDM electrode between the transport position and the spotface position. The driving mechanism may include an air cylinder and an air cylinder shaft, the spotface positioning mechanism further including a bearing assembly attached to an end of the air cylinder shaft, and the pivot finger being rotatably coupled to the bearing assembly for rotation about the air cylinder shaft.

A method of machining the shroud support plate is also provided. The method includes inserting the EDM tool into a previously formed substantially cylindrical bore formed in the shroud support plate; machining the shroud support plate using the EDM tool; and removing a slug from the shroud support plate to form a hole in the shroud support plate. A method of forming the spoff ace is also provided.

The present invention enables the removal of material in approximately 5% of the time when compared to the conventional EDM process. Moreover, foreign material exclusion (chip retention) is addressed by incorporating a fully enclosed tool housing performing as a receptacle for the machining chips produced. Furthermore, the tool and method provide a superior surface finish (as compared to the conventional EDM process), whereby subsequent grinding can be eliminated.

BRIEF DESCRIPTION OF THE DRAWINGS

These and other aspects and advantages of the present invention will become apparent from the following detailed description of preferred embodiments when taken in conjunction with the accompanying drawings, in which:

FIG. 6 illustrates a hole geometry of the shroud support plate after the hole is formed;

FIG. 8 illustrates the collet assembly of the EDM tool according to the invention;

BEST MODE FOR CARRYING OUT THE INVENTION

Figure 1:
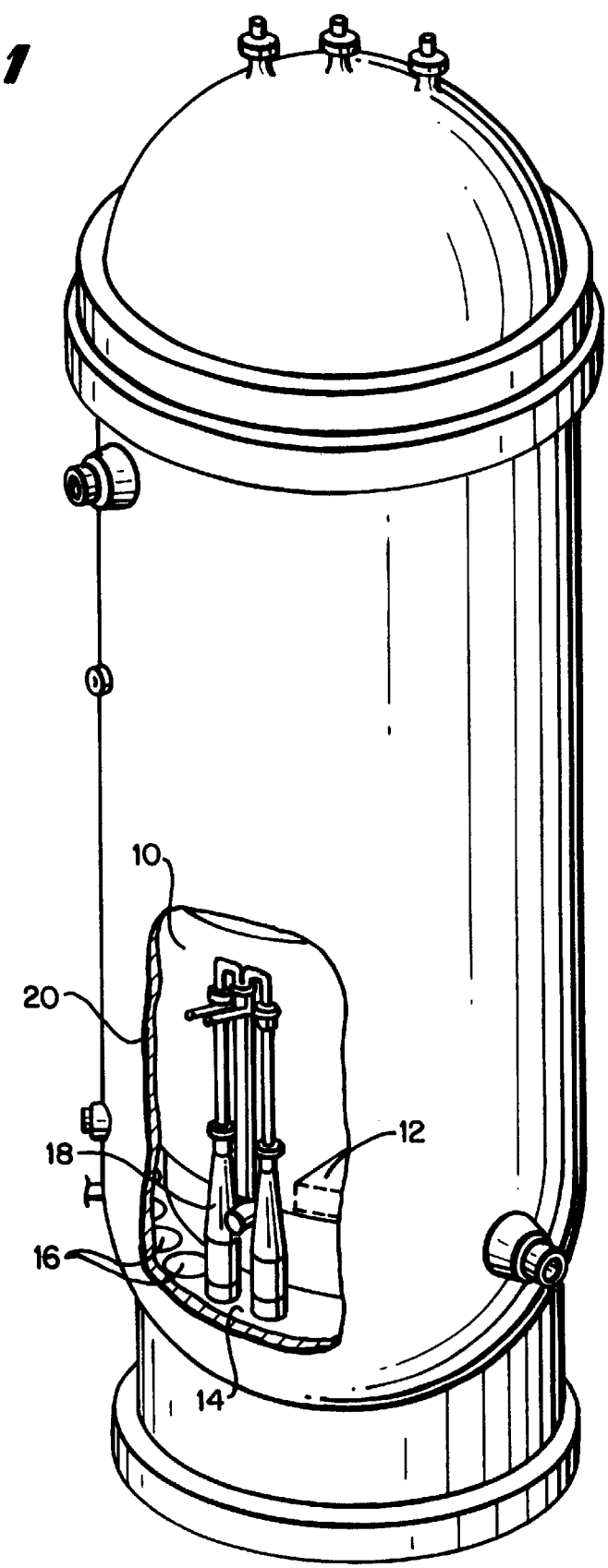
FIG. 1 is a perspective view of a nuclear reactor vessel, partially cut away to show the internal components of the vessel.

Referring to FIG. 1, a nuclear reactor vessel is shown in perspective partially cut away to show the internal components of the vessel. A core shroud 10 is supported by a core shroud support assembly 12 in a core shroud support plate 14. A plurality of holes 16 are formed circumferentially around an outer periphery of the core shroud support plate 14 and house a corresponding plurality of jet pump diffusers 18, which are disposed between a vessel wall 20 and the core shroud 10.

In order to perform maintenance and modifications to the reactor vessel internal components, it may be necessary to form holes in the core shroud support plate 14 between the jet pump diffusers 18. As is clear from FIG. 1, any machining operation of the shroud support plate 14 must be performed underwater in a very restricted working envelope.

Figure 2:
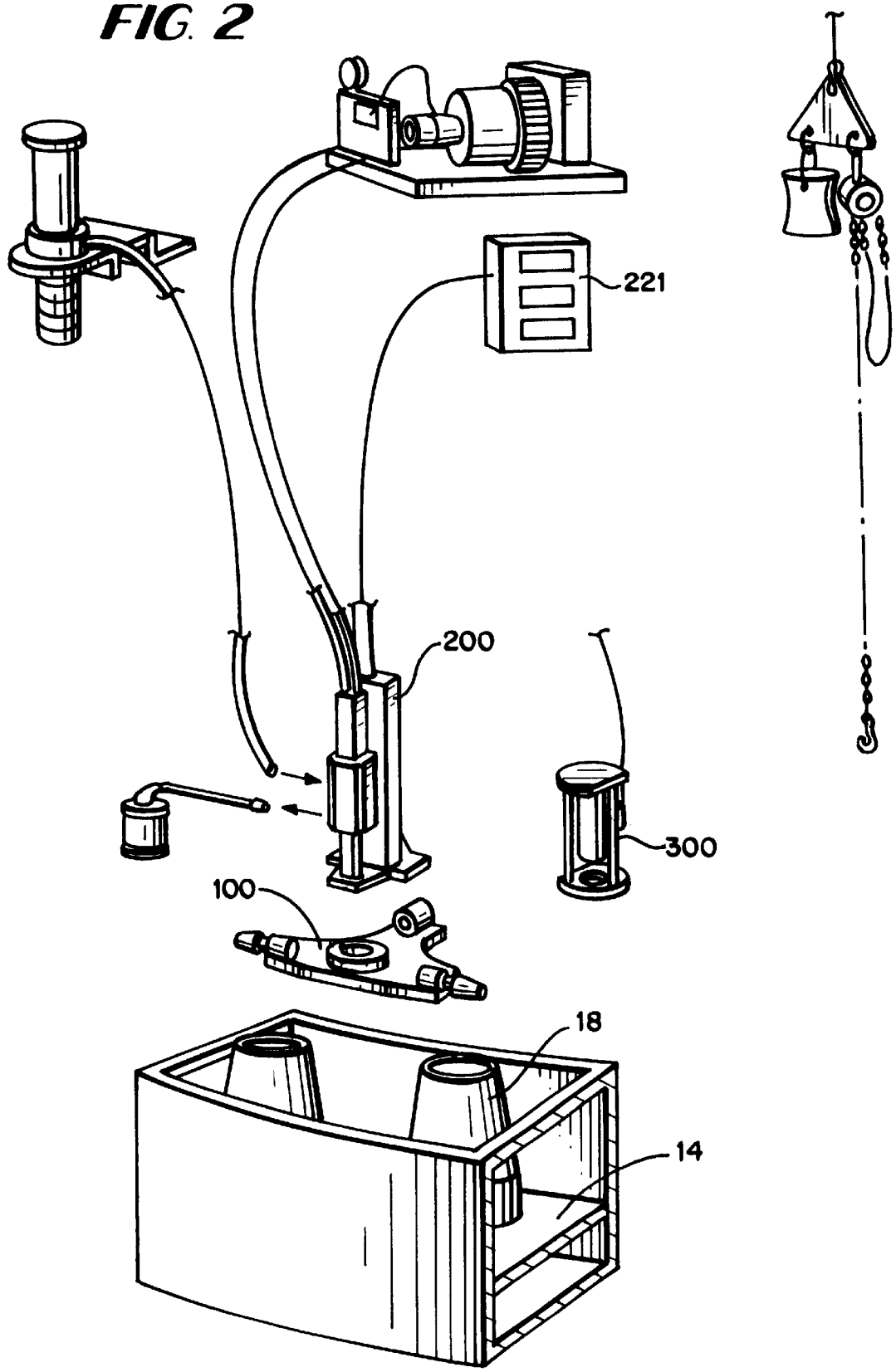
FIG. 2 illustrates the components of the underwater drilling tool of the present invention.

Referring to FIG. 2, the present invention provides an underwater remote drilling tool for forming holes in the core shroud support plate 14 rapidly and efficiently. The invention includes a support base 100 that is securely attachable to the shroud support plate 14 between two jet pump diffusers 18. The support base 100 is configured to receive a drilling tool 200 that performs a first hole forming operation in the core shroud support plate 14 and an EDM tool 300 that performs a second hole forming operation in the core shroud support plate 14. The support base 100, the drilling tool 200 and the EDM tool 300 will be described in detail with reference to FIGS. 3–13, wherein like reference numerals are used throughout to represent like elements.

Figure 3A:
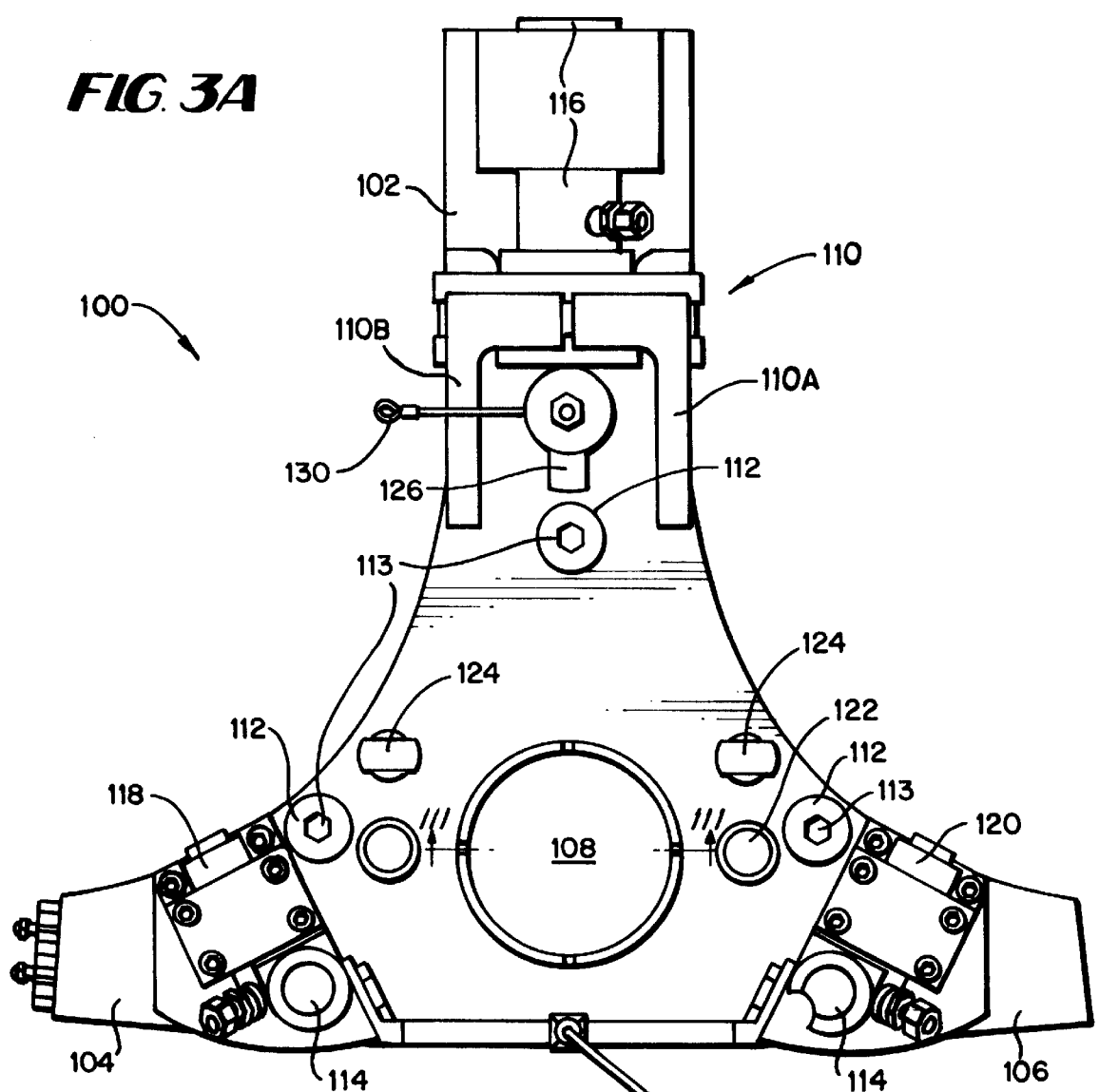
FIG. 3A is a plan view of the support base according to the present invention.
Figure 3B:
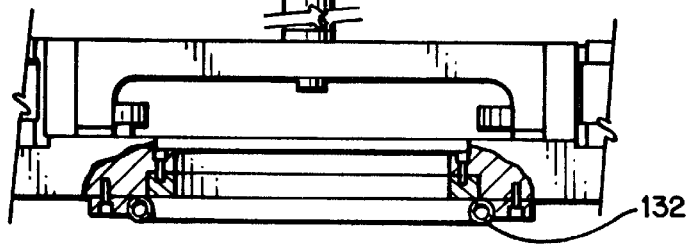
FIG. 3B is a cross-section view through line III—III in FIG. 3A.

FIG. 3A is a plan view of the support base 100. FIG. 3B illustrates a cross-sectional view through line III—III in FIG. 3A.

The support base 100 is a substantially T-shaped member, including a first leg 102 forming the base of the T-shape, a second leg 104 and a third leg 106 forming the cross of the T-shape. An aperture 108 is substantially centrally disposed between the second and third legs 104, 106 and axially aligned with the first leg 102. The aperture 108 provides access to the shroud support plate 14 for the drilling tool 200 and the EDM tool 300 when the support base 100 is secured in place.

After the support base 100 is positioned between the two diffusers 18, the support base 100 is centered between the diffusers 18 by a centering device 110. The centering device 110 includes a pair of centering arms, 110A and 110B, that move together outwardly while remaining parallel to abut the diffusers 18 and center the support base 100 between the diffusers 18. The centering device 110 is a known arrangement, and any structure that will center the support base between the diffusers 18 can be used. Further description of the centering device 110 is therefore omitted.

To properly machine the shroud support plate 14 using the support base 100, the support base 100 must be leveled on the surface of the shroud support plate 14. The support base 100 includes a plurality of threaded leveling feet 112, preferably three, that are axially displaceable to level the support base 100. The leveling feet 112 preferably include hexagonal apertures 113 that are configured to receive an adjusting tool (not shown). Further, disposed on the second and third legs 104, 106, the support base 100 includes two bubble levels 114 to ensure that the support base 100 is level prior to the machining operation. In operation, after the support base 100 is lowered between the diffusers 18, an operator situated over 80 feet above the shroud support plate 14 uses a viewing device (not shown) to view the bubble levels 114, while adjusting the leveling feet 112 with the adjusting tool.

The support base 100 is lowered into the reactor vessel so that when the support base 100 is supported by the shroud support plate 14, the first leg 102 faces the core shroud 10, the second and third legs 104, 106 partially surround adjacent jet pump diffusers 18, and the outer surface of the second and third legs 104, 106 (i.e., the cross member of the T-shape) faces the vessel wall 20. The first leg 102 includes a first extendible member 116 that is preferably hydraulically actuated. The first extendible member 116 is extendible to engage the core shroud 10. The second leg 104 includes a second extendible member 118 that is also preferably hydraulically actuated and engages one of the two jet pump diffusers 18. The third leg 106 includes a similar extendible member 120 that is engageable with the other of the two jet pump diffusers 18. After the support base 100 is centered by the centering device 110 and leveled using the leveling feet 112 and the bubble levels 114, the first, second and third extendible members 116, 118, 120 are hydraulically actuated to firmly secure the support base 100 in position between the diffusers 18.

The support base 100 also includes two positioning dowel holes 122 disposed on opposite sides of the aperture 108. The positioning dowel holes 122 are configured to receive positioning dowels fixed to the drilling tool 200 and the EDM tool 300 (described later). Once the positioning dowels of the tool are received in the positioning dowel holes 122, the tool is secured to the support base 100 by screwing threaded bolts into respective threaded apertures 124 in the support base 100. Yet another aperture 126 substantially centrally disposed between the second and third legs 104, 106 is formed in the support base 100 for receiving a swing clamp (described later) of the machining tools.

A cable 128 is swingably attached to the support base 100 for lowering the support base 100 into the reactor vessel. When the support base 100 is lowered in the reactor vessel, the support base 100 has a substantially vertical orientation to facilitate its fit between the vessel wall 20 and the core shroud 10. As the support base approaches the shroud support plate 14, a second cable 130 is used to shift the support base 100 to a horizontal orientation. These cables can take any form, and the invention is not meant to be limited to what has been illustrated and described.

Referring to FIG. 3B, a substantially circular sealing member 132 is disposed coaxially with and radially outside of the aperture 108. The sealing member 132 prevents any material resulting from the machining operation to contaminate the water in the reactor vessel. The first, second and third extendible members 116, 118, 120 are disposed above the aperture 108 and sealing member 132; as a result, when the extendible legs 116, 118, 120 are hydraulically actuated, a downward force urges the sealing member 132 into sealing engagement with the shroud support plate 14.

Figure 4A:
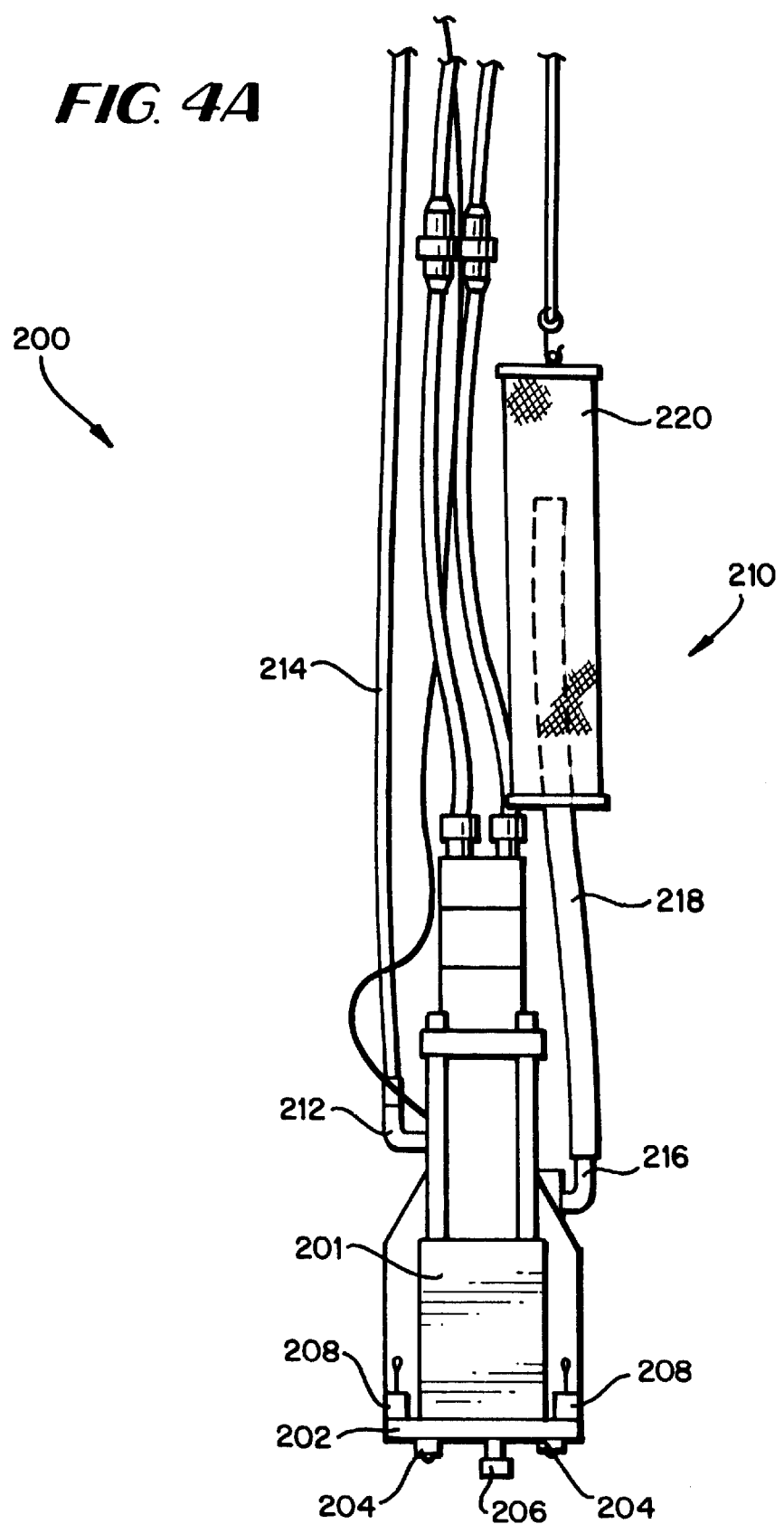
FIGS. 4A and 4B illustrate the exterior components of the drilling tool according to the invention.
Figure 4B:
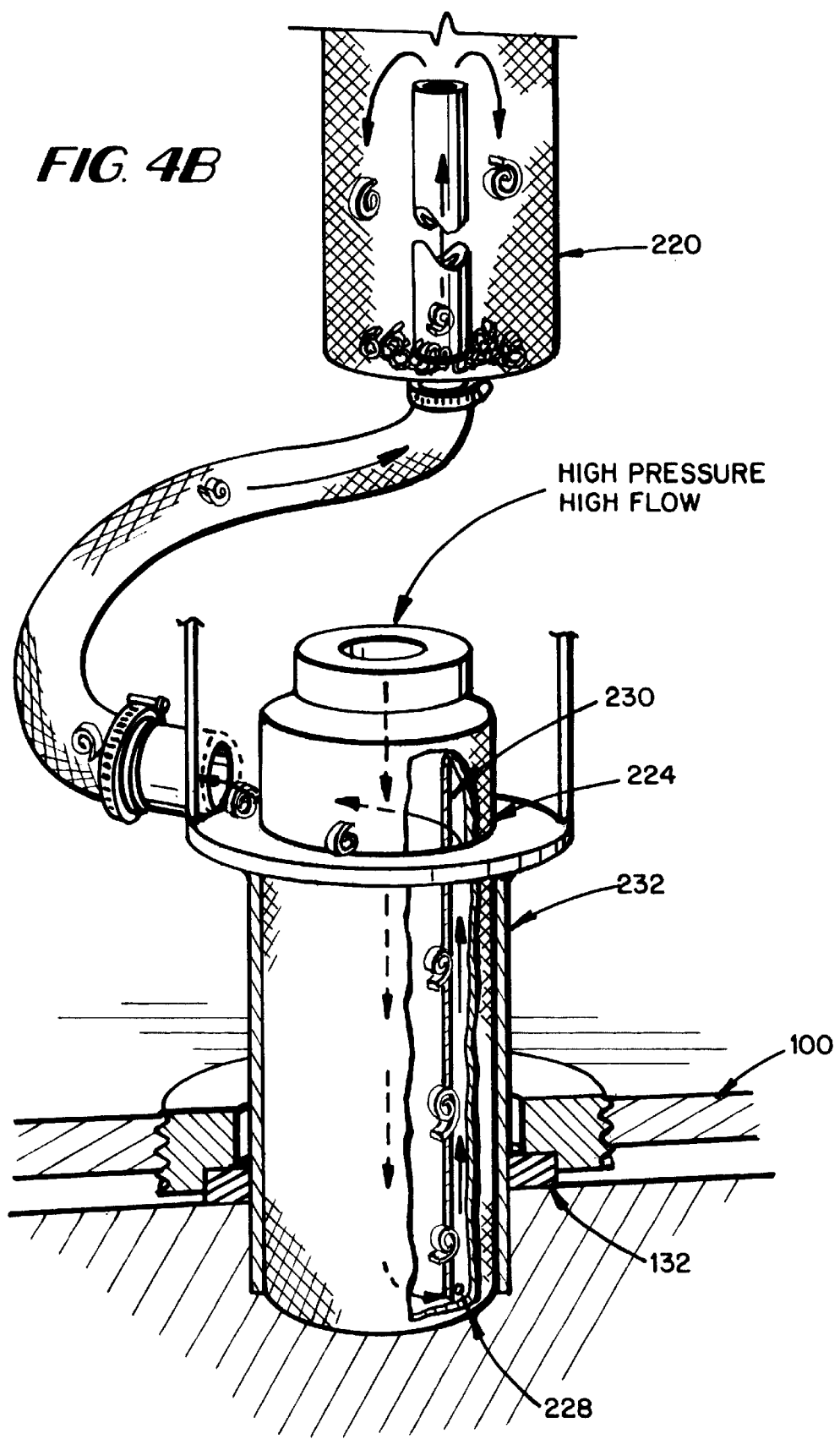

After the support base 100 is secured in place between the jet pump diffusers 18, the drilling tool 200 is lowered into the vessel to the base 100 to begin the machining operation. FIGS. 4A and 4B illustrate front view of the drilling tool 200. As noted above, the drilling tool is attached to the previously secured support base 100 between the jet pump diffusers 18 in the reactor vessel. The drilling tool 200 includes a tool housing 201 having at its lower end a drilling tool base plate 202. Affixed to the bottom of the base plate 202 are two positioning dowels 204 adapted to be received by the positioning dowel holes 122 of the support base 100. The drilling tool base plate 202 also includes a swing clamp 206 that is received in the swing clamp receiving aperture 126 in the support base 100. The swing clamp 206 is a hydraulically actuated locking clamp. After it is inserted into the swing clamp aperture 126, the swing clamp 206 is hydraulically rotated and retracted to pinch the support base 100. On the top surface of the drilling tool base plate 202 are provided a pair of locking screws 208 that are adapted to threadedly engage the threaded holes 124 of the support base 100. The locking screws 208 are secured by an operator situated above the reactor vessel using a locking tool. After the drilling operation is complete, the tool is removed by reversing the order of the above-described steps.

Figure 5A:
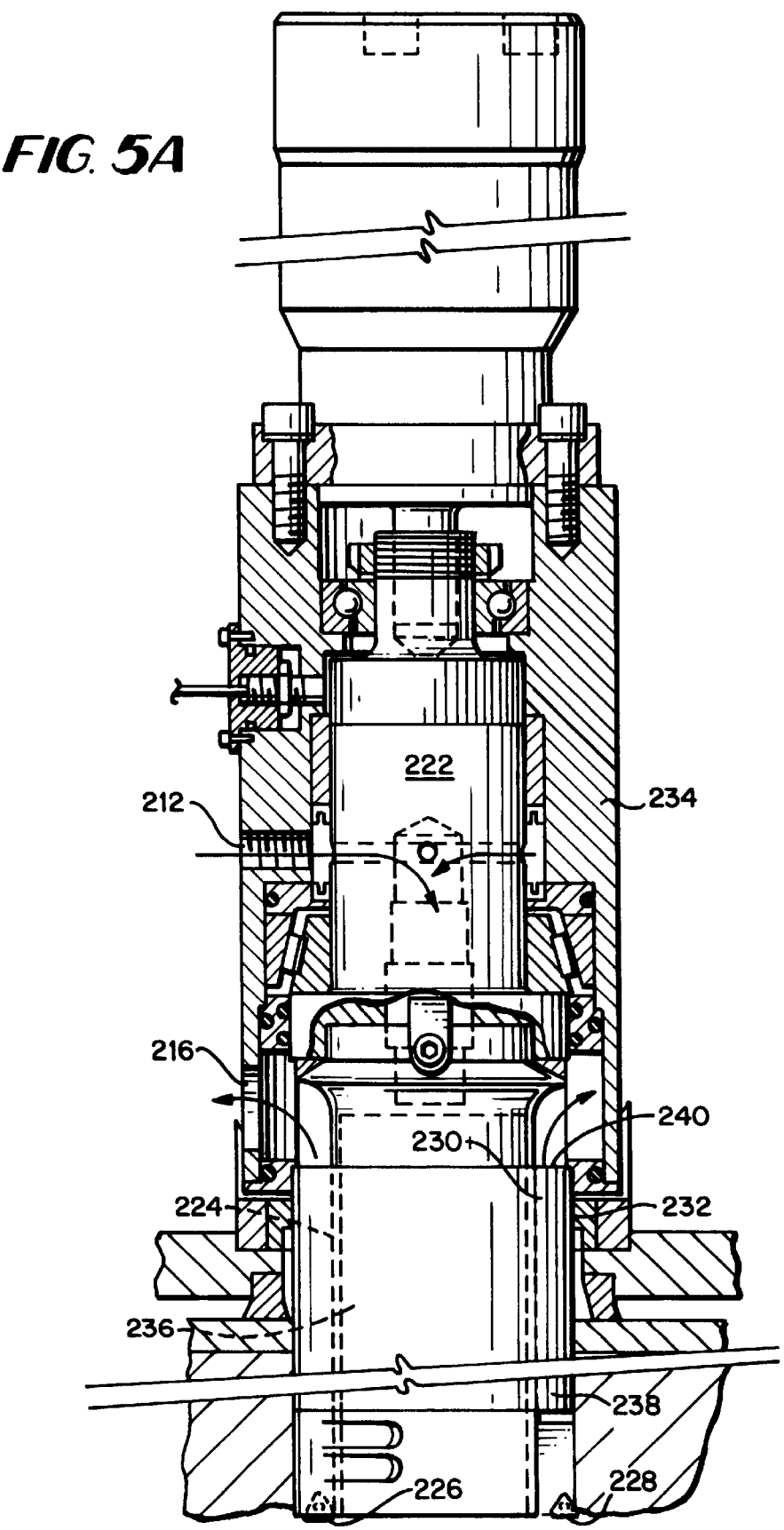
FIG. 5A is a cross-sectional view through the drilling tool of the invention.
Figure 5B:
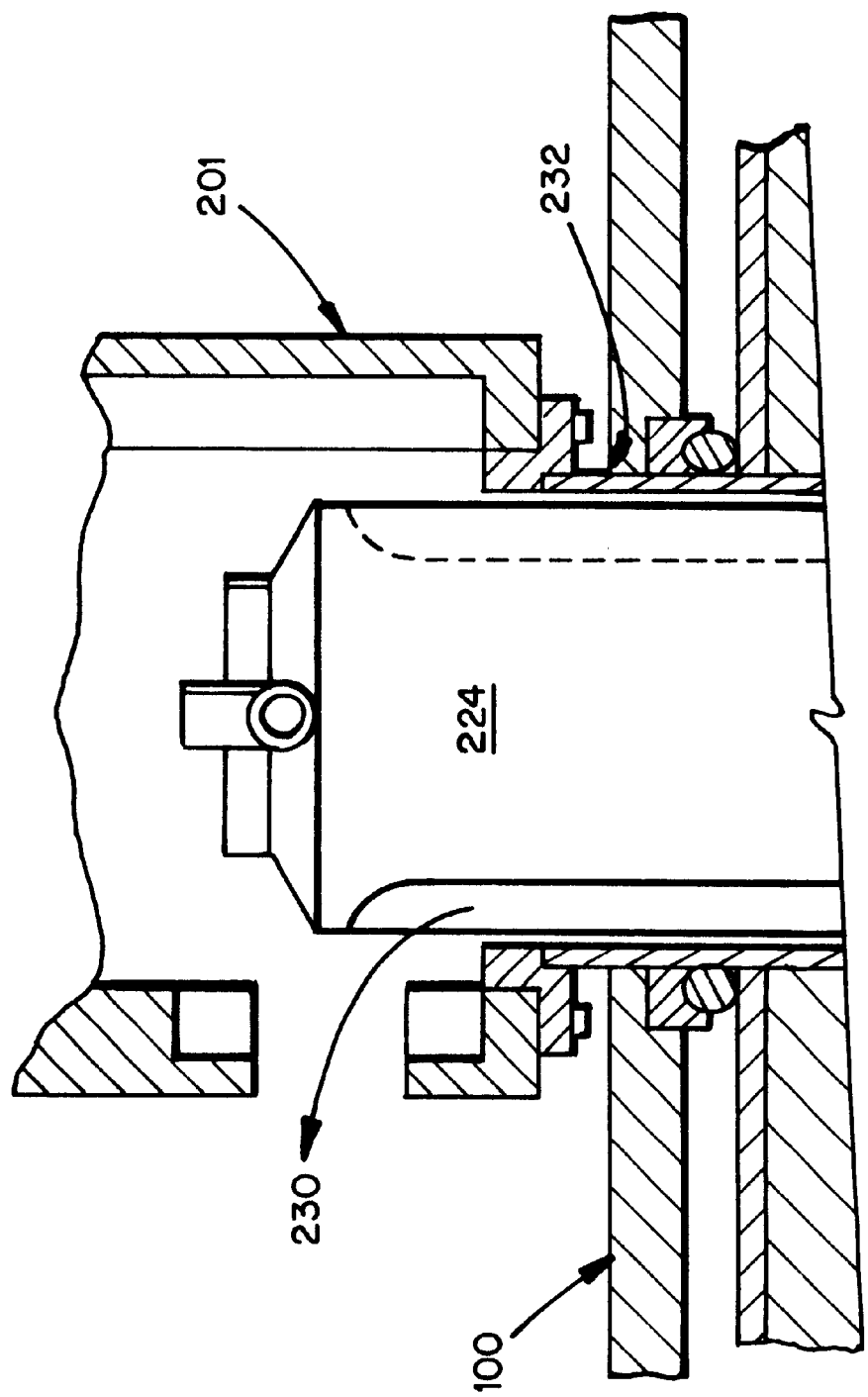
FIG. 5B shows additional detail of the drill housing, drill bit and sleeve.

Referring to FIGS. 5A and 5B, disposed inside the housing 201 of the drilling tool 200 is a rotatable spindle 222 coupled to a DC servo motor. An industry standard trepan style drill bit 224 is secured to the rotatable spindle 222 for rotation with the spindle 222. The standard drill bit includes two carbide inserts that form an inner cutter 226 and an outer cutter 228. The drill bit 224 is cylindrical and includes a hollow cylindrical center. At least one flute 230 is cut into the drill bit. The inner cutter 226 is fixed adjacent the inside surface of the drill bit, and the outer cutter 228 is fixed adjacent the outside surface of the drill bit. During rotation, the areas machined by the inner and outer cutters 226, 228 overlap, providing a continuous cut. A stainless steel sleeve 232 is fixed from rotation surrounding the drill bit 224. During the drilling process, the stainless steel sleeve 232 is fed with the drill bit 224.

An induction ring 234 surrounds the bottom portion of the spindle 222 and the top portion of the drill bit 224, surrounding the area where the spindle 222 and the drill bit 224 are connected. The induction ring 234 includes a water inlet 212 and a water outlet 216 described below. The inlet 212 is formed in the induction ring 234 and the spindle 222 and guides the water into the central cylindrical area 236 of the drill bit 224. The water travels through the central cylindrical area 236 to the surface being machined and acts as a lubricant for the cutting blade on the surface of the shroud support plate 14 (essentially hydroplaning the tool). Conventional lubricating oils cannot be used due to the limitations of introducing harmful elements into the reactor environment.

As the high pressure, high volume water passes over the surface being machined, chip that is produced as a result of the drilling operation is carried through a small notch adjacent the carbide inserts comprising the inner and outer cutters 226, 228 into a flute inlet 238. The water and chip in the flute inlet 238 flow to a flute outlet 240 at a spindle end of the drill bit and through the outlet 216. The volume of water flowing through the drill bit is preferably in the range of about 60 to 80 gallons per minute (gpm) at a pressure in the range of about 60 to 80 psi. As a result of this structure along with the high volume, high pressure water, all chip produced during the drilling operation is flushed to the chip basket, avoiding any deleterious effects to the reactor vessel.

An important advantage of the present invention is the ability to vary the feed rate in accordance with the rotating speed of the drill bit. The DC servo motor and feed motor are controlled by a basic controller 221 that controls the feed rate in accordance with the rotating speed of the drill bit. In a preferred embodiment, the drill bit has a diameter of about 4.3 inches. The spindle 222 is rotated in the range of 90 to 140 rpm and is fed in the range of 250 to 450 thousandths of an inch per minute.

With continued reference to FIGS. 4A, 4B, 5A and 5B, the drilling tool 200 includes an improved chip containment section 210. The chip containment section 210 includes a water inlet 212 for guiding water from a water hose 214 to the drill bit 224 and the surface being machined. Chips that are produced during the machining operation are carried by the high pressure, high volume water to an outlet 216. The water and chip flow through an outlet hose 218 into a chip basket 220. The chip basket 220 is a mesh basket having a mesh size of about 10,000 holes per square inch. As a result, the chip is contained in the chip basket 220, allowing the water to continue its flow. In the event that very small pieces of chip escape the chip basket 220, those chips will likely be so small that they will not have any deleterious effects.

FIG. 6 is an exploded cross-sectional view of the shroud support plate 14. The shroud support plate 14 is generally formed of three materials. A first layer 14A of the shroud support plate 14 is typically comprised of Inconel, a second layer 14B forming a majority of the shroud support plate 14 is formed of a low alloy, such as carbon steel, and a third layer 14C of the shroud support plate 14 is generally formed of stainless steel. The drilling tool 200 forms a substantially circular bore 15 in the shroud support plate 14 through about 90% of the thickness of the shroud support plate 14. After the drilling tool 200 is removed from the bore 15 and separated from the support base 100, the EDM tool 300 is lowered into the reactor vessel. Similar to the drilling tool 200, the EDM tool 300 includes structure that is adapted to be received by the support base 100 to thereby secure the EDM tool to the support base 100.

The EDM component of the system removes a ligament of material remaining after the drilling operation is completed. This ligament is approximately ¾ inch from the bottom of the shroud support being drilled. The precise thickness is achieved by ultrasonic testing (UT) of the shroud support plate before drilling is started and by setting the depth desired in the tool control system. The EDM process is started after complete chip removal by vacuuming, following the drilling component removal, including visual inspection. Removing the chips before EDM breach of the support, assures the chipless breakthrough. As described below, the EDM tool engages the slug top area to capture it for removal following the cut.

Figure 7A:
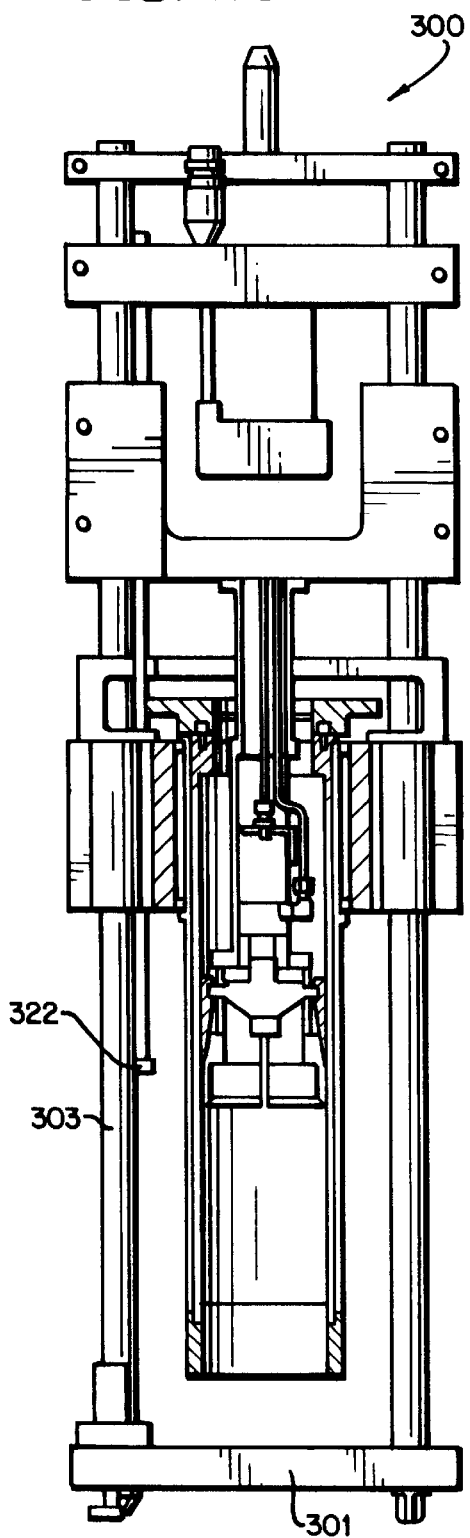
FIGS. 7A and 7B illustrate the EDM tool in a severer configuration and a spotface configuration, respectively.
Figure 7B:
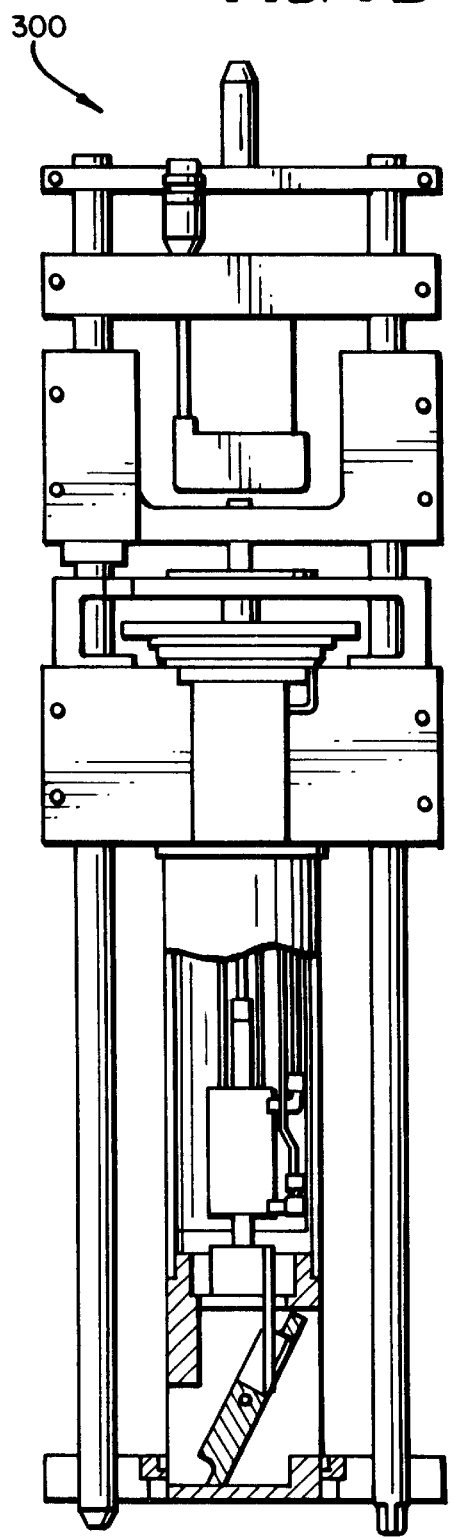

Referring to FIGS. 7A and 7B, the EDM tool 300 includes two configurations, a severer configuration and a spotface configuration. The severer configuration will be described with reference to FIGS. 7A, 8 and 9.

Figure 9:
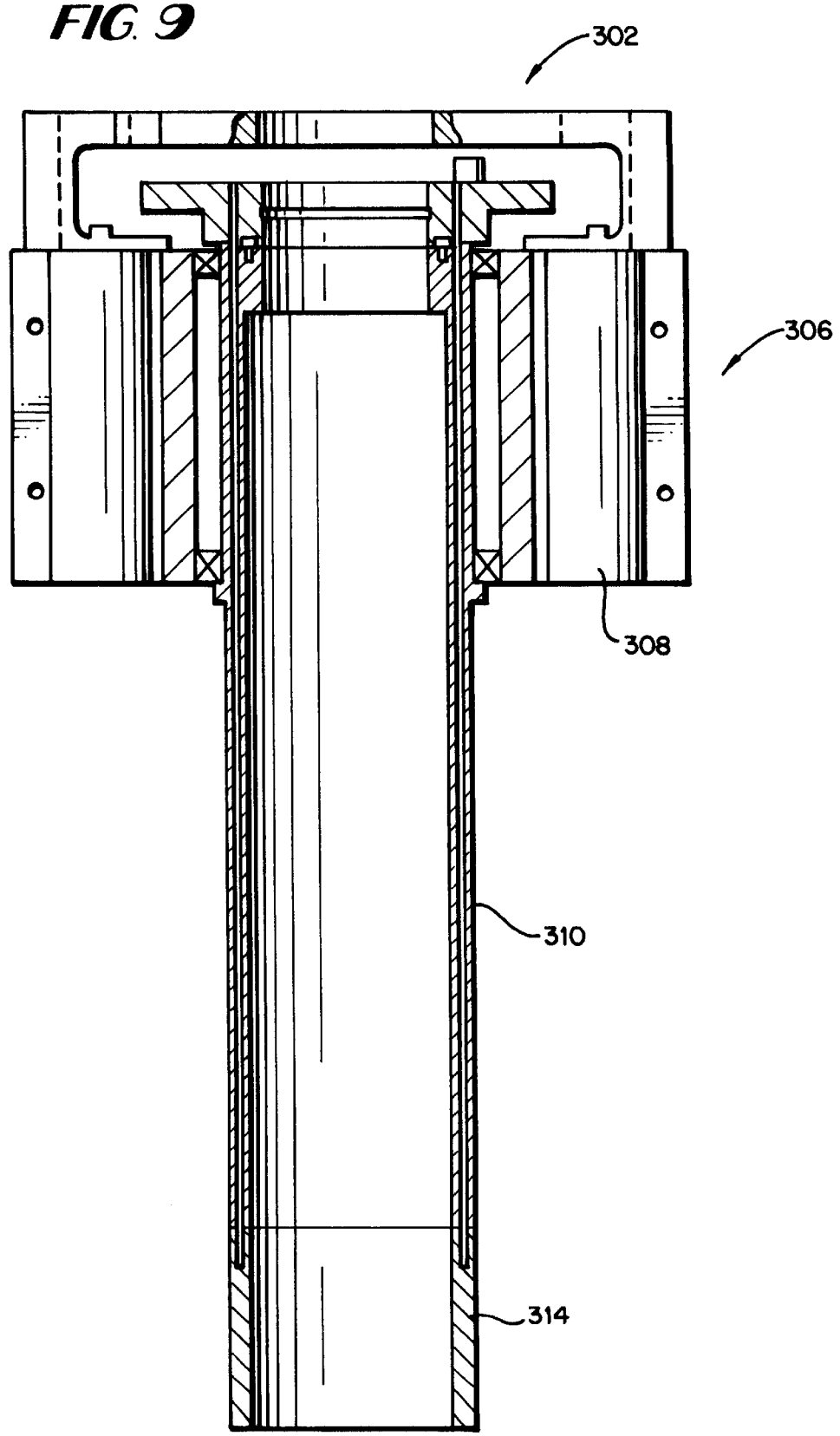
FIG. 9 illustrates the spindle assembly of the EDM tool according to the invention.

The severer configuration primarily includes a spindle assembly 302 and a collet assembly 304. Referring to FIG. 9, the spindle assembly 302 includes a carriage assembly 306. Each configuration includes a supporting frame 301 having a pair of rails 303. The structure for attaching the EDM tool 300 to the support base 100 is mounted to a bottom plate of the support frame 301. The carriage assembly 306 includes a pair of radial bearings 308 that are configured to slide axially along the rails 303. A spindle 310 is rotatably supported by the carriage assembly 308. Radial bearings 312 are provided between the carriage assembly 308 and the spindle 310. In the severer configuration, a sever electrode 314 is fixed to an end of the spindle assembly 310. The carriage assembly 306 is preferably moved along the rails by a motor driven ball screw, and a second motor rotates the spindle assembly 310 inside of the carriage assembly 306. Those of ordinary skill in the art will contemplate alternatives for driving the carriage assembly 306 along the rails 303 and for rotatably driving the spindle assembly 310.

The collet assembly 304 includes a collet carriage 316 and a collet extension 318 coupled to the collet carriage 316. The collet extension 318 is adapted to be non-rotatably inserted into the spindle 310 of the spindle assembly 302 and includes linear bearings 320 for riding on the rails 303 of the support frame similar to the linear bearings 308 of the carriage assembly 306. The collet carriage 316 is freely movable on the rails 303 and rests on the carriage assembly 306 by gravity. FIG. 7A illustrates the collet assembly and spindle assembly 302 formed as a unit in the severer configuration.

The support frame 301 additionally includes a stop rod 322 that limits the axial displacement of the collet assembly. In operation, because the collet carriage 306 is freely movable on the rails 303, the collet assembly moves with the spindle assembly.

The collet extension 318 includes at an end thereof a substantially cylindrical collet 324 that is sectioned into four segments and configured to grip the slug of material machined from the shroud support plate. The collet 324 is actuated by a hydraulic cylinder 326 driving a cylindrical member 328 over the collet 324. After the collet 324 is placed over the slug, the hydraulic cylinder 326 is actuated to drive the cylindrical member 328 downward over the collet, inwardly deflecting the collet to grab the slug. An outer surface of the collet 324 preferably includes a 10° taper, and the cylindrical member 328 is formed with a corresponding 10° taper.

The process of the EDM tool 300 in the severer configuration will be described with reference to FIGS. 10A–D.

Figure 10A:
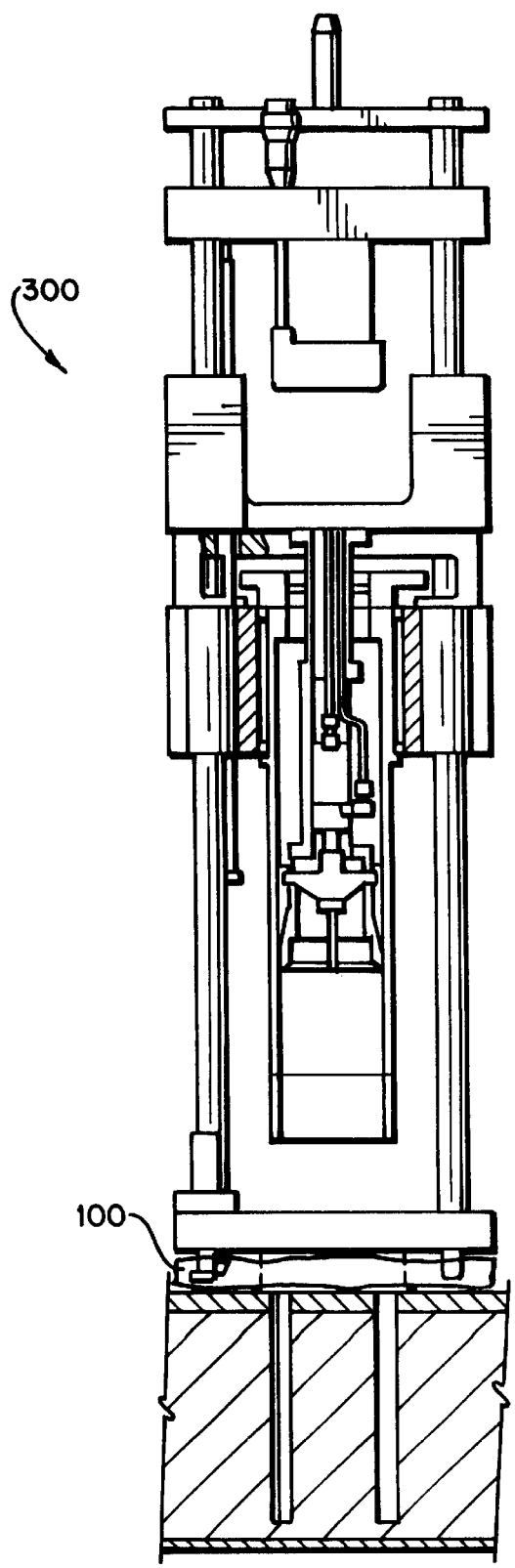
FIGS. 10A–10D illustrate the process carried out by the EDM tool in the severer configuration.
Figure 10B:
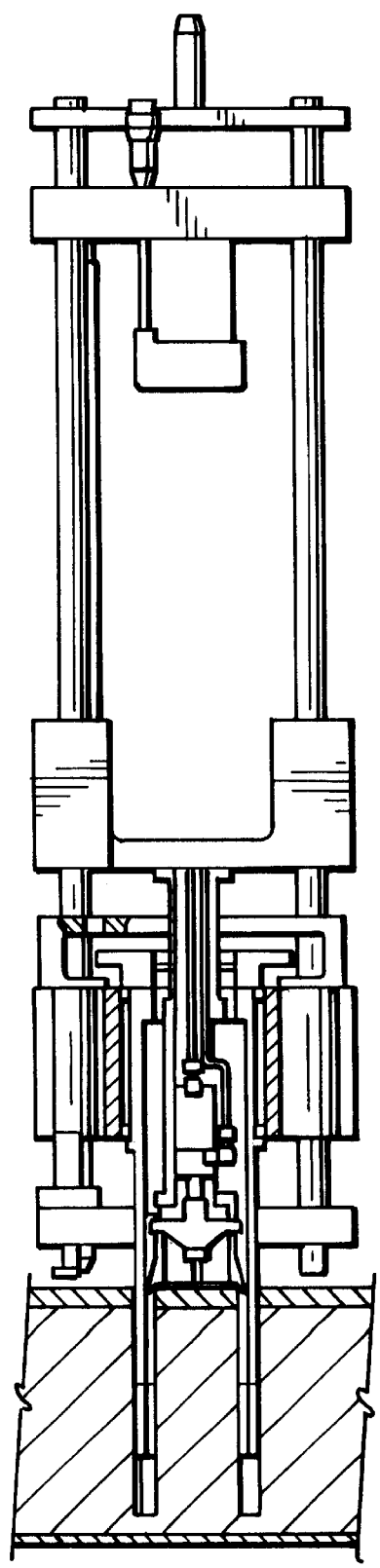
Figure 10C:
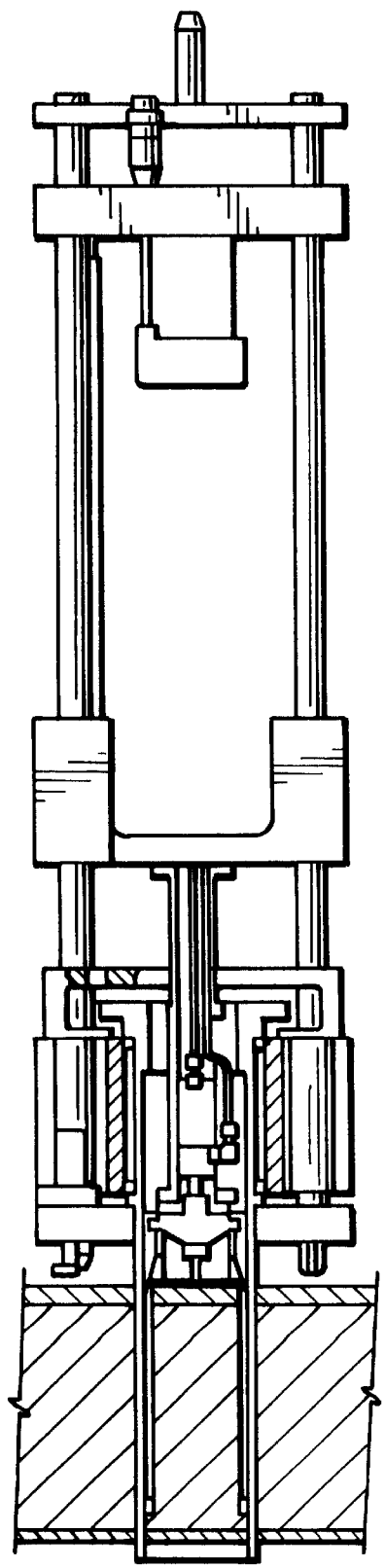

The EDM tool 300 is lowered into the reactor vessel and coupled to the support base 100 using the positioning dowels 204 and the swing clamp 206 fixed to the support frame 301. The collet assembly 304 having been inserted into the spindle assembly 302 follows the spindle assembly 302 into the bore 15 formed by the drilling tool 200 by axial displacement of the spindle assembly 302 by the ball screw. In FIG. 10B, axial displacement of the collet assembly 304 is stopped by the stop rod 322. The stop rod 322 is configured to stop the collet assembly 304 so that the collet 324 surrounds an upper portion of the slug. The hydraulic cylinder 326 is actuated to force the cylindrical member 328 over the collet 324, causing the collet 324 to radially deflect inwardly to grip the slug.

Figure 10D:
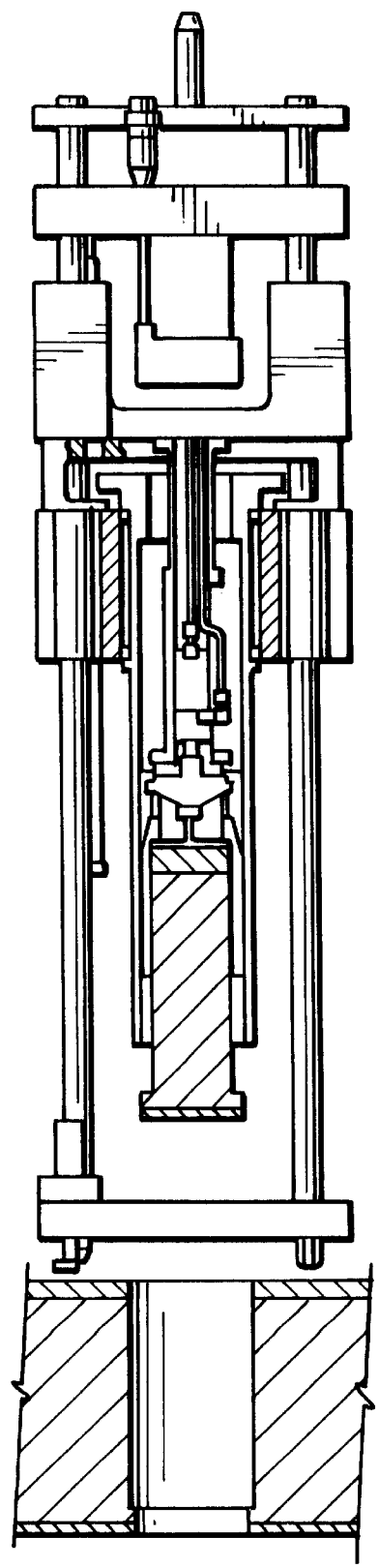

The spindle assembly 302 continues its axial displacement into the bore 15 until the severer electrode 314 is disposed adjacent the remaining portion of the shroud support plate 14. The spindle assembly 302 with the severer electrode 314 attached is then rotated to perform a conventional EDM process on the remaining portion of the shroud support plate 14. Because the EDM process is a known process, the details of the process will not be further described. A known suction tool suctions swarf during the EDM process. Referring to FIG. 10D, when the EDM process is complete and the shroud support plate 14 has been cut through, the spindle assembly 302 is driven axially upwardly, carrying the collet assembly 304 to a retracted position, thereby removing the slug from the shroud support plate 14.

In place of the EDM process to machine the final portion of the shroud support plate 14, the drilling tool may be further developed to perform a "can opener" type of finishing cut that will essentially pierce and rotate through the last thickness of metal instead of machining away the material. Accurate depth of cut will be monitored (initial thickness measurements will be taken using UT) to assure that the remaining ligament is facilitative of piercing.

FIG. 7B illustrates the EDM tool 300 in the spotface configuration. After the slug is removed from the shroud support plate 14, the EDM tool is reconfigured in the spotface configuration to perform a spotface operation. The spotface operation produces a spotface surface on the underside of the hole, for a specified distance around the perimeter of the hole. The spotface surface assures that the bottom surface of the hole is perpendicular to the hole axis.

Figure 11:
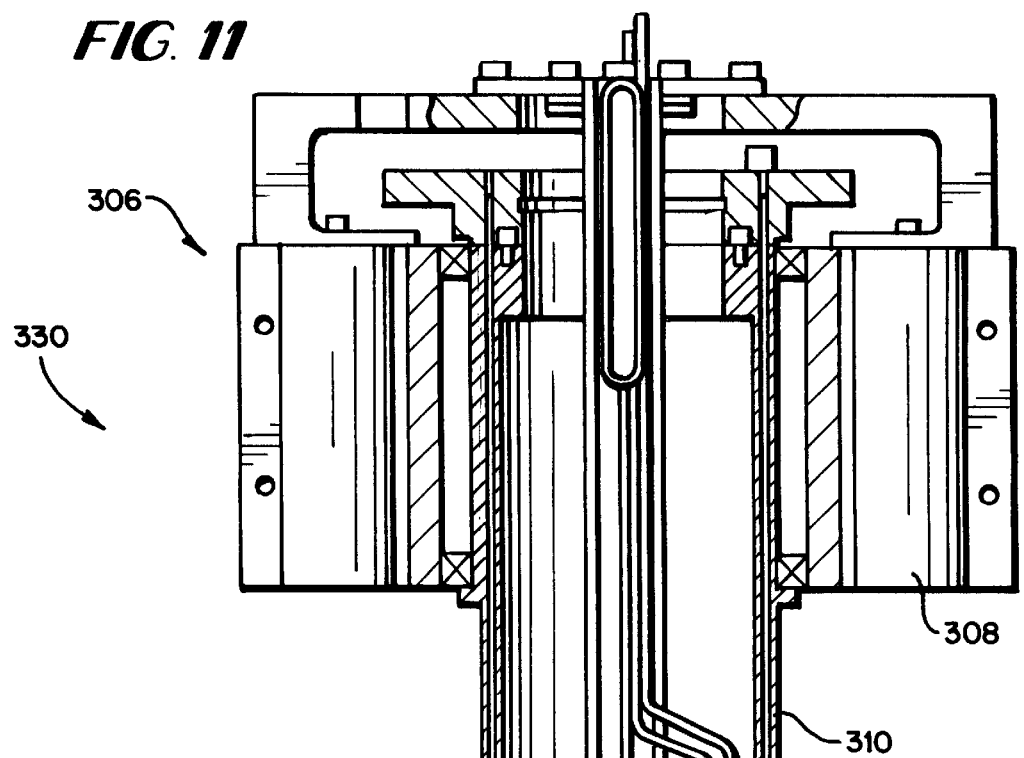
FIG. 11 illustrates the spotface assembly of the EDM tool according to the invention.

Referring to FIGS. 7B and 11, the spotface assembly 330 includes the EDM tool support frame 301 and rails 303. The carriage assembly 306 of the spotface assembly 330 is the same as the carriage assembly 306 of the spindle assembly 302. Furthermore, the spindle 310 of the spotface assembly is also the same as the spindle 310 in the spindle assembly 302. The sever electrode 314 is removed from the spindle 310, and a spotface attachment 332 is attached to the end of the spindle 310.

Figure 12:
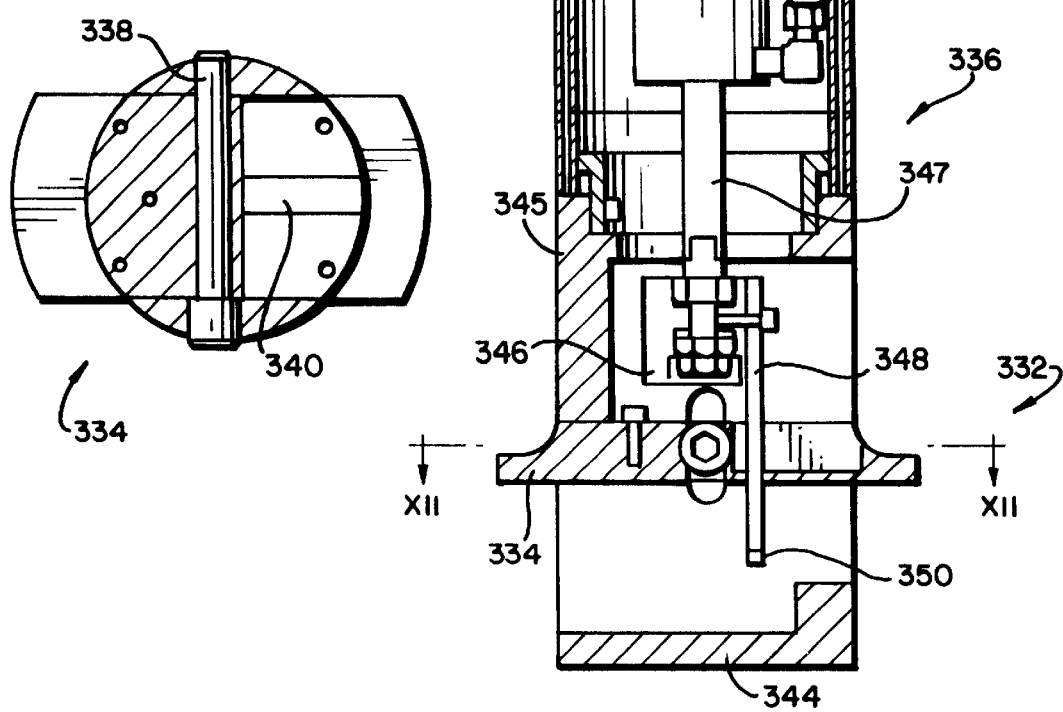
FIG. 12 is a cross-sectional view through line XII—XII in FIG. 11.

The spotface attachment 332 includes a pivotable EDM electrode 334 that forms the spotface on the bottom surface of the shroud support plate 214. The electrode 334 is pivotable between a transport position (FIG. 7B) and a spotface position (FIG. 11) by a spotface positioning mechanism 336 (described later). Referring to FIG. 12, the electrode 334 pivots about a central axis 338 and 15 includes an elongated aperture 340 for receiving a portion of the spotface positioning mechanism 336.

The spotface positioning mechanism 336 includes an air cylinder 342 having an air cylinder shaft 347 attached to a bearing assembly 346. The positioning mechanism 336 is disposed inside of the spindle 310 and is fixed to the carriage assembly 306 such that it does not rotate with the spindle 310. Attached to the bearing assembly is a rotatable pivot finger 348 that engages the elongated slot 340 of the electrode 334. An end 350 of the pivot finger 348 has a cross member that is disposed perpendicular to the pivot finger 348 and engages the electrode 334 to pivot the electrode between the transport position and the spotface position depending on the position of the air cylinder 342. The bearing assembly 346 enables the pivot finger 348 to rotate with the spindle 310 and the electrode 334 while allowing the air cylinder 342 to remain stationary. Members 344 and 345 limit the pivoting movement of the electrode 334 in the transport position and the spotface position, respectively.

Figure 13A:
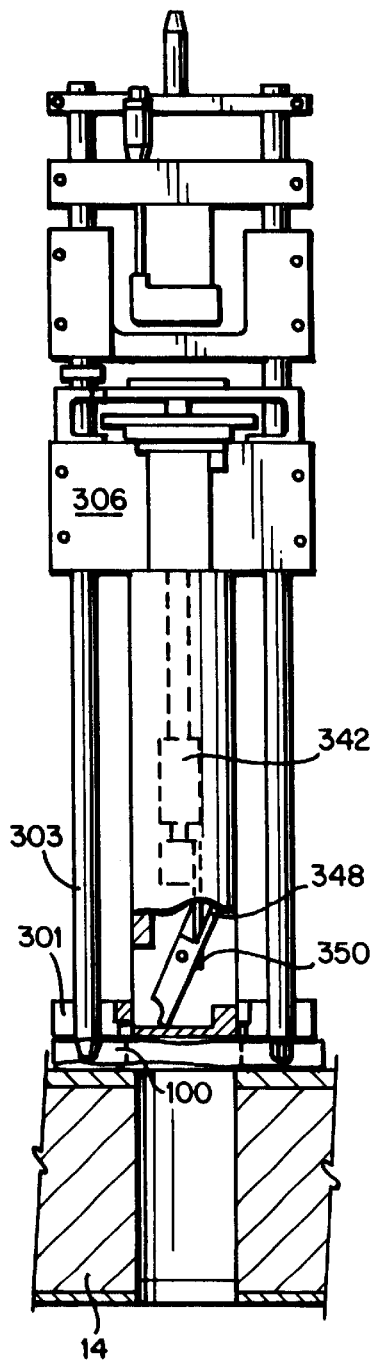
FIGS. 13A–13C illustrate the process carried out by the EDM tool in the spotface configuration.
Figure 13B:
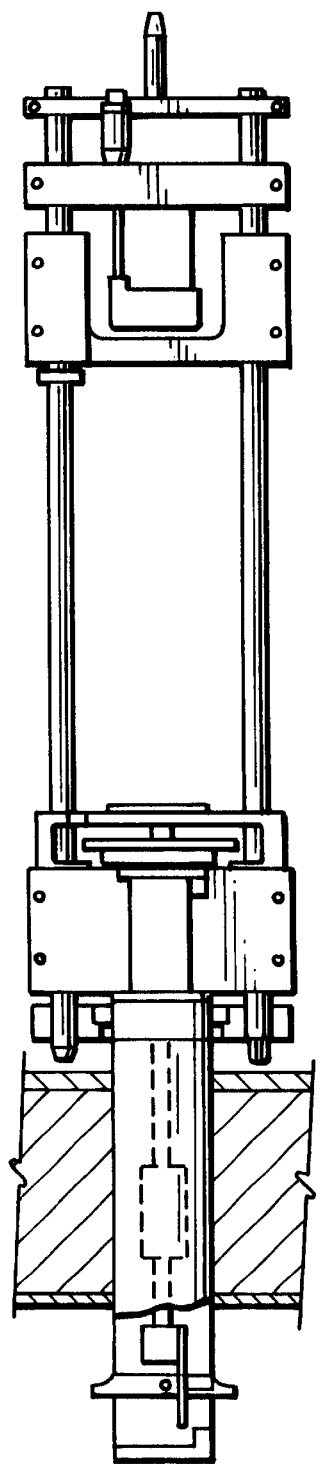
Figure 13C:
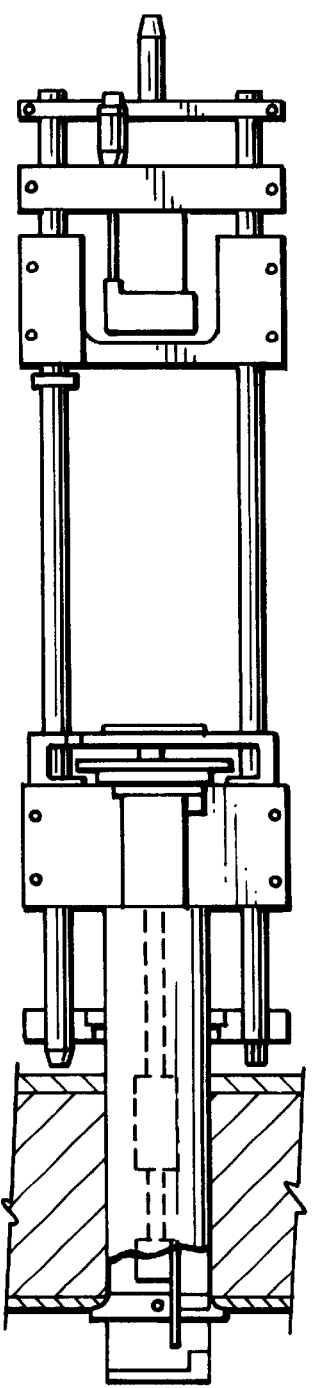

The operation of the EDM tool in the spotface configuration will be described with reference to FIGS. 13A–C. FIGS. 13A–C illustrate the shroud support plate 14 with the slugs removed. The support frame 301 and rails 303 of the EDM tool remain fixed to the support base 100 described previously. When the spotface assembly is poised above the hole in the support plate 14, the air cylinder 342 is in its retracted position such that the cross member of the end portion 350 of the pivot finger 348 engages the elongated slot 340 of the electrode 334 to hold the electrode 334 in its transport position.

As shown in FIG. 13B, the carriage assembly 306 is lowered so that the spotface assembly is inserted into the hole in the support plate 14. The carriage assembly 306 continues its axial downward displacement until the electrode 334 passes beyond the bottom surface of the support plate 14. At that time, the air cylinder 342 is actuated to extend the air cylinder shaft 347, thereby causing the electrode 334 to pivot to its spotface position. The carriage assembly 306 is then retracted so that the spotface electrode 334 is disposed adjacent the bottom surface of the shroud support plate 14 as shown in FIG. 13C. The conventional EDM process is then performed using the spotface electrode to form a spotface on the bottom surface of the shroud support plate 14 (see FIG. 5A). Swarf that is created during the EDM process is vacuumed by a conventional vacuuming apparatus. After the EDM process is completed and the spotface is formed, the carriage assembly 306 lowers the spotface attachment 332 below the bottom surface of the shroud support plate 14 to enable the electrode to be pivoted to its transport position by retracting the air cylinder shaft 347 with the air cylinder 342. The carriage assembly 306 is then axially displaced upwardly to remove the spotface attachment 332 from the hole. The process is then complete.

Referring to FIG. 12, the electrode has a substantially circular shape with parallel edges removed. The spotface formed by the electrode 334 preferably forms a slight radius in the interface between the spotface and the bore of the hole (see FIG. 6). This slight radius helps to accommodate the geometry of the hardware installed in the hole.

In an alternative arrangement (not shown), the drilling tool is configured to drill holes in pairs around the top circumference of the shroud. The drilling tool includes two independent spindles housed within the frame, to allow drilling both holes with a single tool setup.

Positioning of the tool is accomplished by supporting the frame off of guide lugs, oriented in the same azimuth as the holes to be drilled. The relation of the holes is based on their distance from a ledge just above the tool. Once the tool is supported by the guide lugs, it is then raised to come directly in contact with the ledge of the shroud, providing the fixed position of the holes. To substantially brace the tool (absolute rigidity is necessitated by the nature of the process, reaction forces exerted, etc.), telescopic (piggy-backed pending required stroke) hydraulic cylinders are extended horizontally, forcing the face of the tool against the shroud wall. With the horizontal locking cylinders and the stop at the shroud ledge, the tool is substantially locked into position.

With the tool firmly locked to the workpiece, the system is designed to feed every chip created back into the housing of the tool. Actual cutting is accomplished by using a "standard" Hougen Rota-broach tool bit. This type of cutter is a one piece, spirally fluted, multi-tooth trepan style cutter. Having multiple cutting teeth, and producing a core with the cut is desirable when considering that it minimizes horsepower requirements (smaller tool packaging) as well as produces fewer chips. The chips produced are long spirals. Due to the long spiral geometry of the chips (potential for folding/bent spirals), this type of tool bit is best suited for applications of less than 2" thick. To facilitate chip compacting, once the spirals exit the cut, chip breakers are deployed within the tool housing. Without the chip 22 breakers, the spirals would have a tendency to "birds-nest" around the tool spindle. Below the spindles, the chips drop to a lower section of the tool housing. This lower section acts as a receptacle for the chips.

Another feature of this alternative tool/process is the manner in which the slug is retained. By design of the cutting bit, a flange is left on the exit side of the slug. Throughout the cutting process, water is introduced through the center of the tool bit. This cools the cutting edges and facilitates chip exhausting. Nearing the end of the cut, the flow is turned off. Monitoring the backside of the surface being cut, it can be visually noticed when the cut is completed. As soon as the cut is broken through, a suction is drawn through the tool bit. This suction draws the slug back into the tool bit. The spindle is then retracted into the tool housing, and pneumatically operated doors close over the opening. This process is repeated for both holes.

With the slug enclosed and the chips deposited within the lower receptacle, total chip containment is accomplished. The entire tool is then unlocked and removed from the vessel annulus. Once at a predetermined location, the pneumatically operated doors are opened and the slugs deposited into a final refuse container. Similarly, the receptacle section of the tool also has a pneumatically operated trap door, which is opened to dispose of the chips captured within.

The spindles are driven with hydraulic motors, configured at right angles to the spindle (due to the envelope), and power is transmitted through worm gears. The feed axis is similarly set-up, although the power is transmitted to an acme lead screw for feeding. The spindle rotation and feed axis are powered by TEA (reactor compatible hydraulic fluid) from a single source hydraulic skid. Integral with the top of the tool is a valve body/solenoid housing, which is pre-calibrated to send the hydraulic medium to each axis as required.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A drilling tool for drilling a bore in a core shroud support plate of a core shroud in a nuclear reactor vessel, the drilling tool comprising:
   a rotatable spindle;
   a substantially cylindrical drill bit coupled to the spindle for rotation about a central axis and for displacement along the central axis;
   a sleeve surrounding said drill bit, said sleeve being fixed from rotation such that said sleeve does not rotate with said drill bit, said sleeve being fed with said drill bit along the central axis; and
   a chip collection system collecting chip produced during drilling.

2. A drilling tool for drilling a bore in a core shroud support plate of a core shroud in a nuclear reactor vessel, the drilling tool comprising
   a rotatable spindle;
   a substantially cylindrical drill bit coupled to the spindle;
   a sleeve surrounding said drill bit, said sleeve being fixed from rotation such that said sleeve does not rotate with said drill bit;
   a chip collection system collecting chip produced during drilling; and
   an induction ring disposed surrounding a connection area between said spindle and said drill bit, said chip collection system comprising a fluid inlet into said induction ring and into said spindle.

3. A drilling tool according to claim 2, wherein said drill bit comprises a flute having a flute inlet at a cutting end of said drill bit and a flute outlet at a spindle end of said drill bit, said induction ring including a ring outlet disposed adjacent said flute outlet, said chip collection system further comprising said flute and said ring outlet.

4. A drilling tool according to claim 3, wherein said chip collection system further comprises a mesh chip basket communicating with said ring outlet, said mesh chip basket being configured to collect said chip produced during drilling.

5. A drilling tool according to claim 4, wherein said mesh chip basket comprises a mesh size of about 10,000 holes/in$^2$.

6. A drilling tool for drilling a bore in a core shroud support plate of a core shroud in a nuclear reactor vessel, the drilling tool comprising:

a rotatable spindle;

a substantially cylindrical drill bit coupled to the spindle;

a sleeve surrounding said drill bit, said sleeve being fixed from rotation such that said sleeve does not rotate with said drill bit;

a chip collection system collecting chip produced during drilling; and a housing surrounding said spindle, said drill bit and said sleeve, said housing including a drilling tool base plate having at least one locating dowel facing said shroud support plate, said at least one locating dowel being shaped to fit into a corresponding at least one locating hole on a support base secured to said shroud support plate.

7. A drilling tool according to claim 6, wherein said drilling tool base plate further comprises an attachment member for securing said drilling tool to said support base.

8. A drilling tool according to claim 6, wherein said drilling tool base plate further comprises a hydraulic swing clamp shaped to fit through a swing clamp hole in said support base.

9. A drilling tool for drilling a bore in a core shroud support plate of a core shroud in a nuclear reactor vessel, the drilling tool comprising:

a rotatable spindle;

a substantially cylindrical drill bit coupled to the spindle;

a sleeve surrounding said drill bit, said sleeve being fixed from rotation such that said sleeve does not rotate with said drill bit;

a chip collection system collecting chip produced during drilling; and a DC servo motor and a feed motor operatively coupled to said spindle for rotatably driving said spindle and said drill bit and for feeding said spindle and said drill bit, respectively, wherein a rotating speed and a feed rate of said spindle and said drill bit are variable.

10. A drilling tool according to claim 9, further comprising a controller communicating with said DC servo motor and said feed motor, said controller controlling said feed rate based on said rotating speed.

11. A drilling tool according to claim 10, wherein said rotating speed is in the range of 90–140 rpm, and wherein said feed rate is in the range of 250–450 thousandths in/min.

* * * * *

UNITED STATES PATENT AND TRADEMARK OFFICE
CERTIFICATE OF CORRECTION

PATENT NO. : 6,309,147 B1  
DATED : October 30, 2001  
INVENTOR(S) : Matsumoto et al.

Page 1 of 1

It is certified that error appears in the above-identified patent and that said Letters Patent is hereby corrected as shown below:

Column 4,  
Line 3, delete "spofface" and insert -- spotface --.  
Line 25, delete "spofface" and insert -- spotface --.

Column 6,  
Line 67, delete "illustrate front" and insert -- illustrate a front --.

Column 10,  
Line 10, delete "spofface" and insert -- spotface --.  
Line 30, delete " 15".

Column 11,  
Line 57, delete "22".

Signed and Sealed this

Second Day of April, 2002

Attest:

JAMES E. ROGAN  
Attesting Officer     Director of the United States Patent and Trademark Office